United States Patent
Kuehner et al.

(10) Patent No.: US 12,157,528 B2
(45) Date of Patent: Dec. 3, 2024

(54) SYSTEM AND METHOD TO PREVENT LATERAL CONTROL BY LIMITING TURNING BY A STEERING WHEEL

(71) Applicant: TOYOTA RESEARCH INSTITUTE, INC., Los Altos, CA (US)

(72) Inventors: Manuel Ludwig Kuehner, Mountain View, CA (US); Jaime S. Camhi, Los Gatos, CA (US); Hiroshi Yasuda, San Francisco, CA (US); Daniel J. Brooks, Arlington, MA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/736,532

(22) Filed: May 4, 2022

(65) Prior Publication Data

US 2023/0356775 A1 Nov. 9, 2023

(51) Int. Cl.
*B62D 6/00* (2006.01)
*B62D 5/00* (2006.01)
*B62D 5/04* (2006.01)

(52) U.S. Cl.
CPC .......... *B62D 6/008* (2013.01); *B62D 5/006* (2013.01); *B62D 5/0481* (2013.01)

(58) Field of Classification Search
CPC ...... B62D 6/008; B62D 5/006; B62D 5/0481; B62D 15/0265; B62D 5/001; B62D 15/029

See application file for complete search history.

(56) References Cited

U.S. PATENT DOCUMENTS

| | | | |
|---|---|---|---|
| 8,752,664 B2 | 6/2014 | Rombold | |
| 10,960,924 B2 | 3/2021 | Rowell | |
| 2011/0279254 A1* | 11/2011 | Raste | B60W 30/09 |
| | | | 701/41 |
| 2019/0126971 A1* | 5/2019 | Kim | B62D 5/006 |

FOREIGN PATENT DOCUMENTS

| | | |
|---|---|---|
| CN | 106143407 | 11/2016 |
| CN | 109733471 | 5/2019 |
| CN | 110877610 | 3/2020 |
| CN | 111867921 | 10/2020 |
| JP | 2020001698 | 1/2020 |

OTHER PUBLICATIONS

Eidehall et al., "Toward Autonomous Collision Avoidance by Steering," IEEE Transactions on Intelligent Transportation Systems 8(1), pp. 84-94, Mar. 2007.

* cited by examiner

*Primary Examiner* — Jacob M Amick
*Assistant Examiner* — Charles J Brauch
(74) *Attorney, Agent, or Firm* — SHEPPARD, MULLIN, RICHTER & HAMPTON LLP; Daniel N. Yannuzzi

(57) ABSTRACT

A system is provided for implementing steering wheel controls, namely steering wheel rotation locking. In accordance with embodiments of the disclosed technology, a system may comprise a steering wheel rotation locking device; and a controller communicatively connected to the steering wheel rotation locking device to determine a presence and location of one or more objects or conditions surrounding a vehicle, and produce steering wheel control feedback to physically prevent rotational movement of a steering wheel.

15 Claims, 5 Drawing Sheets

SYSTEM AND METHOD TO PREVENT LATERAL CONTROL BY LIMITING TURNING BY A STEERING WHEEL

TECHNICAL FIELD

The present disclosure relates generally to computer-controlled vehicle safety technology. In particular, various embodiments describe a vehicle that includes the capability to provide computer-controlled steering wheel controls, as an enhanced safety control feature.

DESCRIPTION OF RELATED ART

Vehicle accidents (e.g., collisions) are a constant threat to drivers, passengers, pedestrians and property. Accidents, which unfortunately result in injury, in some instances, may be caused by the driver. For instance, "driver caused" accidents may be attributed to: a delay in a driver's recognition of a hazardous situation; the driver ability to react accordingly to a hazardous situation; and/or unknowingly maneuvering the vehicle in a manner that is extremely unsafe in the current conditions of the vehicle, road, and/or surroundings. According to NHTSA, there were over 7.2 million reported car accidents in 2016—many of which were avoidable. It may be beneficial to equip vehicles with mechanisms that provide steering wheel controls and/or feedback that can improve safety and/or reacts in a manner that promotes safety (e.g., collision prevention), in order to help protect drivers, passengers, people in other vehicles on the road, and pedestrians from harm.

BRIEF SUMMARY OF THE DISCLOSURE

In accordance with embodiments of the disclosed technology, a system may comprise a steering wheel rotation locking device; and a controller communicatively connected to the steering wheel rotation locking device, wherein the controller: determines a presence and location of one or more objects or conditions surrounding a vehicle, based on an analysis of vehicle data; and upon determining that the presence and location of the one or more objects surrounding the vehicle is within a collision area, controls the steering wheel rotation locking device to produce steering wheel control feedback to physically prevent rotational movement of a steering wheel in a direction that correlates to maneuvering the vehicle in a lateral direction towards the collision area and the presence and location of the one or more surrounding objects.

In some embodiments, the controller further determines a selected position of the steering wheel to engage the steering wheel rotation locking device, wherein the selected position correlates to a steering angle of the steering wheel that maneuvers the vehicle in the lateral direction towards the collision area and the one or more objects surrounding the vehicle.

In some embodiments, the steering wheel rotation locking device comprises a mechanical device that produces the steering wheel control feedback that mechanically engages the steering wheel to lock at the selected position and prevent rotational movement of the steering wheel past the selected position in the direction.

In some embodiments, the steering wheel lateral locking device comprises at least one of: a pin, a clamp, a grip, a stopper, a wedge, a bolt, or fastener device.

In some embodiments, the steering wheel rotation locking device comprises an electro-mechanical system that produces the steering wheel control feedback that electro-mechanically engages the steering wheel to lock at the selected position and prevent movement of the steering wheel past the selected position.

In some embodiments, the electromechanical system comprises at least of: a motor; an actuator, a magnetorheological fluid actuator, a coupler, a hydraulic device, a hydraulic system, or hydraulic clamp.

In some embodiments, the steering wheel rotation locking device comprises an electrical system that produces the steering wheel control feedback that electrically engages the steering wheel to lock at the selected position and prevent rotational movement of the steering wheel past the selected position.

In some embodiments, the electrical system communicates electronic commands to a steer-by-wire system to engage the steering wheel to lock at the selected position.

In some embodiments, the controller enables rotational movement of a steering wheel to positions in an opposite direction that correlate to maneuvering the vehicle in the opposite lateral direction away from the collision area.

In some embodiments, the vehicle data is received from one or more vehicle sensors that monitor one or more area surrounding the vehicle.

In some embodiments, the system further comprises one or more steering wheel sensors to obtain steering wheel data to determine a current position of the steering wheel.

In some embodiments, the controller further analyzes the steering wheel data to determine whether the current position of the steering wheel is at the selected position; and engages the steering wheel rotation locking device.

In some embodiments, the one or more steering wheel sensors comprise at least one of: steering wheel angle sensors, steering torque sensors, turn direction sensors, or analog sensors.

In accordance with another embodiment, a non-transitory computer readable medium comprises instructions, that when read by a processor, cause the processor to determine a presence and location of one or more objects surrounding a vehicle, based on an analysis of vehicle data; and upon determining that the presence and location of the one or more objects surrounding the vehicle is within a collision area, control the steering wheel rotation locking device to produce steering wheel control feedback to physically prevent rotational movement of a steering wheel in a direction that correlates to maneuvering the vehicle in a lateral direction towards the collision area and the presence and location of the one or more surrounding objects.

In some embodiments, the non-transitory computer readable medium further comprises instructions that cause the processor to determine a selected position of the steering wheel to engage the steering wheel rotation locking device, wherein the selected position correlates to a steering wheel angle of the steering wheel that maneuvers the vehicle in the lateral direction towards the collision area and the one or more objects surrounding the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Some vehicles include computer-controlled operational modes, such as vehicles having adaptive cruise control mode, and automated vehicles, in which a computing system is used to navigate and/or maneuver the vehicle along a travel route. Furthermore, vehicles can include advancements and innovations in safety that help prevent crashes and protect people. For example, some vehicles are equipped with technology, such as computer-controlled vehicle safety systems and collision avoidance systems, that are designed to support driver awareness, decision making and vehicle operation over a wide range of speeds. There are vehicle safety systems that provide features which help address several key areas of accident protection: preventing or mitigating frontal collisions (e.g., collision detection), keeping drivers within their lane (e.g., lane departure alert), and enhancing road safety during nighttime driving (e.g., automatic high beams). Moreover, the disclosed embodiments implement a steering wheel locking control system that is designed to provide steering wheel control feedback to the driver, such as locking the steering wheel in a manner that restricts its continued movement to positions that are deemed to unsafely steer the vehicle in a lateral direction towards a potential collision.

Figure 1:
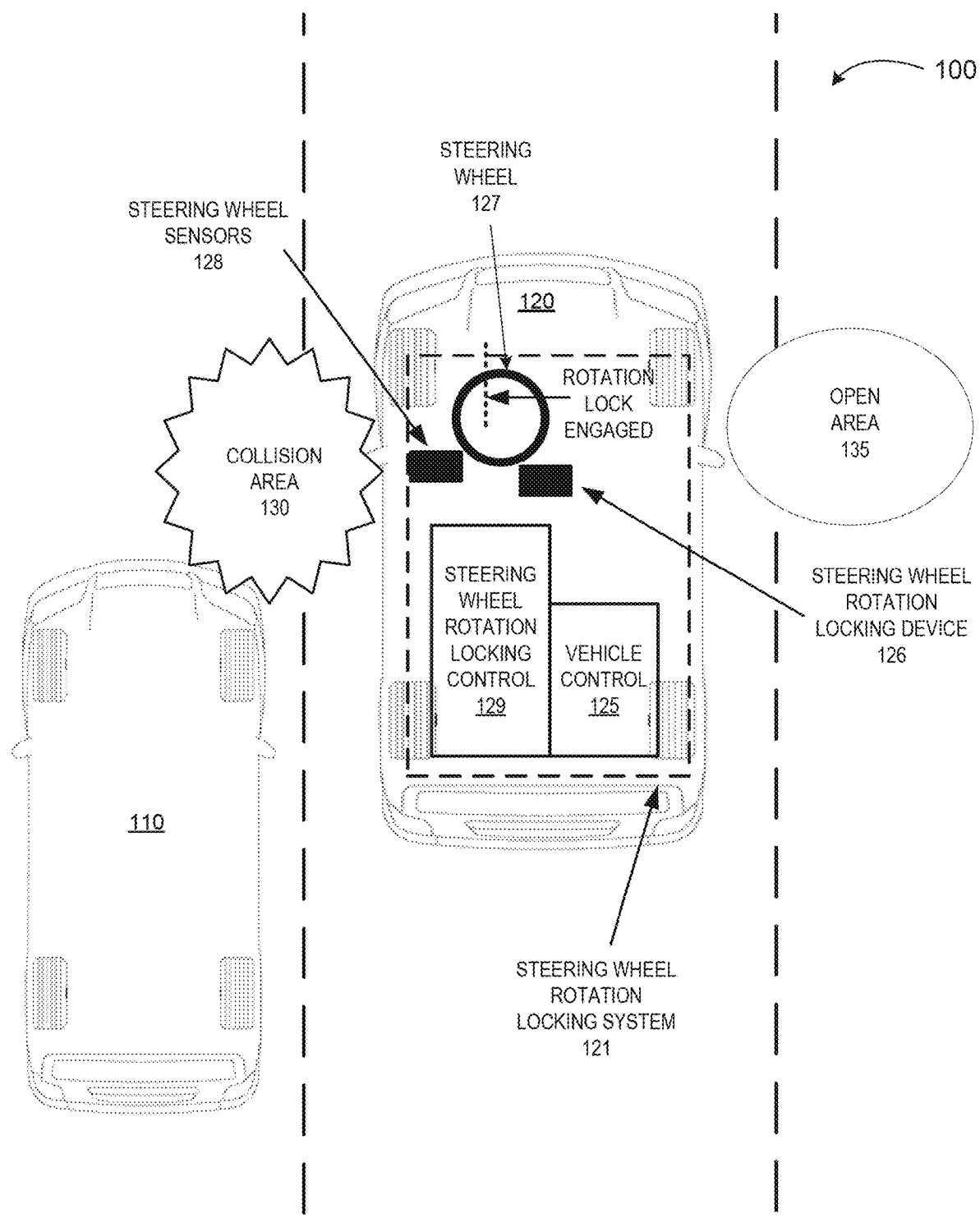
FIG. 1 is an example road environment including a vehicle utilizing the steering wheel locking control system, in accordance with an embodiment of the technology disclosed herein.

Referring now to FIG. 1, an example of a road environment 100 is depicted, which includes a vehicle 120 that is configured to implement the steering wheel rotation locking control system 121 and capabilities, as disclosed herein. In some embodiments, the steering wheel rotation locking capabilities are implemented in a non-autonomous operational mode for vehicle 120, for instance while the driver has some manual control of the vehicle's 120 steering wheel 127. That is, a driver of vehicle 120 may be able to selectively activate or deactivate the steering wheel rotation locking control system 121, as desired, such as activating the system 121 while a manual/non-autonomous driving mode is selected. For the purposes of discussion, vehicle 120 is described in reference to FIG. 1 having the non-autonomous driving mode activated, thereby enabling it to perform the disclosed steering wheel control feature, namely steering wheel rotation locking. FIG. 1 illustrates a road environment where the vehicle 120 is traveling in a lane of a roadway. In many driving scenarios where a vehicle is traveling along streets, roads, and highways, it is common for the vehicle to be dangerously close to objects, neighboring vehicles (e.g., traffic), and other hazards (e.g., potholes, ditch, etc.) that can pose a threat of collision, damage, and/or unsafe maneuvering of vehicle 120 while the driver operates the vehicle 120 on its route. Similarly, FIG. 1 illustrates an example of such a road environment, where another vehicle 110 is proximately located to vehicle 120 while it is in under operational control of a driver. For instance, vehicle 110 is also traveling along the roadway in a lane that is directly adjacent to vehicle 120. Consequently, due to this proximity, the presence of vehicle 110 can be potentially hazardous to vehicle 120 while driving. For example, in FIG. 1, vehicle 110 is traveling slightly behind vehicle 120 in the next lane. However, if vehicle 110 is accelerating forward in its lane at a high enough speed while the driver of vehicle 120 inadvertently steers too far in the direction towards vehicle 110's lane (e.g., steering to left), this could cause vehicle 120 to partially enter the next lane, impeding the forward movement of vehicle 110 and ultimately posing the threat of a collision between the vehicles 110, 120.

Lane changes are some of the most dangerous maneuvers that a driver has to perform regularly. An object (e.g., barricade, barrier, wall), hazard (e.g., pothole, drop-off, cliff, ditch, etc.) or other vehicle may be proximately located (e.g., in an adjacent lane) to a driven vehicle, and positioned such that the driver of the vehicle does not see the aforementioned object, hazard, or vehicle. It should be appreciated that as referred to herein, the term object can be considered as another vehicle, road hazard, or physical object that can cause and/or be directly involved in a collision with a vehicle. Referring back to the road environment of FIG. 1, the vehicle 110 may be in a blind spot with respect to the driver of the vehicle 120, which further heightens the threat of a collision in a lane changing scenarios. In another driving scenarios that may have a high risk of a collision, the driver of a vehicle may simply forget or does not realize that object is located in the adjacent lane. In yet another example of a dangerous driving scenario, the driver of the vehicle may unintentionally steer the vehicle into an area where an object and/or other vehicle is located, as previously described. Even if the vehicle 120 is equipped with computer-controlled vehicle safety technology, the steering wheel control system 121 disclosed herein can serve as an enhancement in potentially dangerous driving scenarios by providing certain steering wheel control features and capabilities that are not currently supported by these systems.

The steering wheel rotation locking system 121 is distinctly configured to restrict the driver's control of the steering wheel 127, for example, by locking the steering wheel 127 at certain point which only allows the steering wheel 127 to be moved by the driver to positions that have been determined safe (e.g., steering the vehicle in a lateral direction avoiding a collision area). As described herein, the steering wheel rotation locking system 121 generates a form of steering wheel control feedback, such as engaging a steering wheel rotation locking device 126, in a manner that prevents the driver from rotating the steering wheel 127 unsafely while operating the vehicle in a plethora of scenarios that may otherwise lead to a collision and/or other dangers. As used herein, a "vehicle" is any form of motorized transport. In the illustrated example, vehicle 120 and nearby vehicle 110 are automobiles. For purposes of illustration, the embodiments will be described here with respect to automobiles. However, it should be appreciated that the steering wheel rotation locking control features disclosed herein are not limited to automobiles. The systems and methods disclosed herein may be implemented with any of a number of different vehicles and vehicle types. For example, the steering wheel rotation locking control systems and methods disclosed herein may be used with automobiles, trucks, boats, recreational vehicles and other like on-or off-road vehicles. In addition, the principals disclosed herein may also extend to other vehicle types as well.

As seen in FIG. 1, the vehicle 120 can implement the steering wheel rotation locking system 121. FIG. 1 shows an example configuration of the steering wheel rotation locking system 121, where the system 121 is comprised of several components, including: vehicle controller 125; steering wheel rotation locking device 126; steering wheel 127; steering wheel sensors 128; and steering wheel rotation locking controller 129. The vehicle controller 125 can be a central processing unit (CPU), processor(s), computing device, circuitry, and/or electronic controller implemented on the vehicle which enables various functions and/or controls other components of the vehicle 120. In particular, vehicle controller 125 can be configured to perform various computer-controlled operational modes, such as safety features (e.g., collision avoidance), autonomous driving operations, and semiautonomous driving operations. The vehicle controller 125 is shown as a stand-alone computing device, however in some embodiments, the vehicle controller 125 may be implemented as a component of a main computer of the vehicle, such as a vehicle's Electronic Control Unit (ECU). The vehicle controller 125 is configured to be communicatively coupled with the disclosed steering wheel rotation locking controller 129 in order to support its functions, as described herein.

FIG. 1 illustrates that steering wheel rotation locking system 121 can include another controller, shown as steering wheel rotation locking controller 129. The steering wheel rotation locking control 129 can be a central processing unit (CPU), processor(s), computing device, circuitry, and/or electronic controller implemented on the vehicle which enables various functions and/or controls related to steering wheel rotation locking and other steering wheel control features. In order to support operations, the steering wheel rotation locking controller 129 can be in communication with other components of the steering wheel rotation locking system 121, as well as other system and components of the vehicle 120, such as sensors and Particular functions of the steering wheel rotation locking controller 129 are described in detail herein.

The vehicle 120 can be a sensor-rich vehicle. Accordingly, the vehicle 120 can include various sensor and/or detection devices, such as sonar sensors, radar sensors, LiDAR sensors, cameras, vehicle proximity sensors, and the like, which can obtain information related to vehicle conditions (e.g., speed, position, etc.) and detected external conditions. For example, vehicle 120 may be equipped with cameras and millimeter-wave radar positioned near the front (and other sections) of the vehicle 120, being arranged such that the imaged field of view includes the surrounding driving environment. As a result, the vehicle 120 can obtain data from one or more sensors that enables its computing systems to sense (or detect) the presence of nearby objects, such as vehicle 110 in the adjacent lane. The vehicle sensors can capture real-time vehicle data, where the vehicle data includes values, parameters, and other data that is indicative of the vehicle itself, such as the vehicle's speed, location, orientation, wheel orientation, lateral movement (e.g., related to steering wheel controls), longitudinal movement (e.g., related to throttle/brake controls), and the like. Furthermore, the vehicle sensors can obtain real-time vehicle data that is indicative of areas external to the vehicle 120 or the surrounding driving environment in which the vehicle 120 is located, such as the roadway that it is currently traveling, or one or more portions thereof. Vehicle data can also indicate characteristics that are relevant to the surrounding (or external) area of vehicle 120, such as detecting the presence/proximity of objects (e.g., barriers, barricade, obstructions, retention walls, etc.), hazards (e.g., potholes, drop-offs, cliffs, etc.), and/or other vehicles with respect to the location of the vehicle 120, and ultimately for detecting a potential collision. Vehicle data can also indicate other characteristics that are relevant to current road conditions associated with the vehicle 120, such as traffic volume, construction, weather, and the like.

As a result, the vehicle data generated by the vehicle sensors can be communicated to the steering wheel rotation locking system 121 in a manner that enables data analysis to be performed by the steering wheel rotation locking control 129. The steering wheel rotation locking control 129 can determine a presence, location, and proximity of one or more objects, hazards, or vehicles surrounding the vehicle 120, based on an analysis of the received vehicle data. Referring to the example of FIG. 1, the steering wheel rotation locking controller 129 can receive vehicle data, such as image data of the nearby vehicle 110 traveling in the next lane, which can be analyzed such that the controller 129 automatically detects that the vehicle 110 is present, even if the vehicle 110 is located in a blind spot of the driver. As alluded to above, the vehicle data can also be analyzed by the steering wheel rotation locking controller 129 in order to determine other values that are pertinent to collision detection, such as location/direction (e.g., coordinates) of the detected object, speed of the detected object, acceleration of the detected object, and the like.

Further, in response to determining that there is a presence (including location, and proximity to the vehicle 120) of one or more objects surrounding the vehicle, the steering wheel rotation locking controller 129 can then determine whether the one or more objects is within a collision area with respect to the vehicle's 120 location. The systems and methods describe herein can also extend to "conditions" as well as objects. The rotation locking controller 129 can detect various objects and conditions that could affect the vehicle's travel. Some objects and conditions can include, but are not limited to road conditions, foreign objects, passing vehicles, incoming pedestrians For example, the vehicle could detect an area of roadway that is abnormal or dangerous due to gravel, oil slicks, ice, or other roadway conditions. As another example, a foreign object may be blocking an area of the road such as a tree branch. The vehicle can detect that branch and determine that the area of the road can cause damage to the vehicle. A collision area can be an external/surrounding area that is proximate to the vehicle 120 and defined by the steering wheel rotation locking controller 129 as having a calculated potential of collision with a detected object. In some embodiments, the steering wheel rotation locking controller 129 can determine the collision area 130 based on set parameters. For instance, the collision area 130 can be defined as a set distance, for example a 25 foot radius, away from any detected object, vehicle, or hazard.

Additionally, the steering wheel rotation locking controller 129 is configured to determine a selected "locked" position for the steering wheel 127. As referred to herein, the "locked" position can be a certain steering angle and/or orientation of the steering wheel 127 that is selected to be the point at which the steering wheel rotation locking device 126 is engaged to stop further rotational movement. In order to make this determination of the "locked" position, the steering wheel rotation locking controller 129 can calculate a correspondence between the steering wheel's 127 steering angle and an expected lateral movement and/or maneuvering of the vehicle's 120 tires. In other words, the steering wheel rotation locking controller 129 can calculate how the steering angle of the steering wheel 127 can affect the vehicle's lateral movement and steering the vehicle 120 further towards/away from a potential of collision. For example, the steering wheel rotation locking controller 129 can determine that the "center" of the steering wheel 171 (0° steering angle), where it is assumed that the driver is not turning the wheel in either direction, is the position that corresponds to a "center" position for the orientation of the wheels (i.e., 0°) which causes the vehicle to move straight ahead with substantially no lateral movement in either direction. Further, the steering wheel rotation locking controller 129 can determine, based on the collision area 130 and detected object (e.g., vehicle 110), which position on the steering wheel corresponds to a lateral movement of the vehicle 120 that would unsafely maneuver it towards a potential collision. Also, the steering wheel rotation locking controller 129 is configured to utilize steering wheel data, described in detail below, in order to detect the current position of the steering wheel 127 with respect to the selected "locked" position, such as when the steering wheel 127 is turned to the "locked" position and should be stopped from further rotational movement (e.g., in the direction towards the collision area 130). In an example, the steering wheel rotation locking controller 129 may determine that if the steering wheel 127 is turned to the position of a 20° steering angle to the left (and any greater steering angle in this direction), it would impart an amount of lateral movement for vehicle 120 towards the collision area 130 in a manner that would make collision with vehicle 110 imminent. Thus, the steering wheel rotation locking controller 129 can select this position (e.g., 20° steering angle to the left) as the selected "lock" position.

As seen in FIG. 1, the steering wheel rotation locking system 121 can include steering wheel sensors 128. The steering wheel sensors 128 can be implemented as sensors and/or detection devices which obtain information related to the steering wheel 127, such as the steering wheel's 127 orientation, position (e.g., rotational angle), torque (e.g., applied by the driver), rotational direction (e.g., rotating to the left, rotating to the right), and the like, which can be pertinent to the disclosed steering wheel rotation locking capabilities. The steering wheel sensors 128 can include a steering wheel angle sensor, a steering torque sensor, turn direction sensors, analog sensors, and the like. In an embodiment, the steering wheel sensors 128 can obtain steering wheel data regarding a current position of the steering wheel 127. For example, the steering wheel sensors 128 can sense that steering wheel 127 is at a "center" position (0° steering angle), which corresponds to the middle point (or center) of the wheels' 127 angular radius. After the driver rotates the steering wheel in a specific direction, whether to the left or right from the center position, the steering wheel sensors 128 can sense its new position, for example 25° degrees to the right. This steering wheel data obtained from the steering wheel sensors 128 enables the steering wheel rotation locking controller 129 to be able perform key capabilities, such as selecting a "locked" position for the steering wheel 127, as well as determining whether the steering wheel 127 is at a position/direction where it should be "locked" or at a position/direction where rotational movement is allowed.

The steering wheel rotation locking device 126 is another component of the steering wheel rotation locking system 121. The steering wheel rotation locking device 126 can be implemented as one of several different forms of devices, tools, apparatuses, or systems which can physically interact with the steering wheel 127 and/or its components in a manner that stops rotational movement. As a general description, the types of implementations for a steering wheel locking device 126 can be categorized as a mechanical or electro-mechanical. Mechanical devices that the steering wheel lateral locking device 126 can be implemented as, include, but are not limited to: a pin, a clamp, grip, stopper, a wedge, a bolt, fastener device, or other device capable of acting as a mechanical end stop. In an mechanical implementation, the steering wheel locking device 126 can be a pin mounted to the column of the steering wheel 127 that, when inserted into a corresponding slot, mechanically interacts with the steering wheel 127 to lock at the selected position and prevent rotation movement of the wheel 127 in at least one direction.

Alternatively, the steering wheel locking device 126 can have an electro-mechanical implementation. Electro-mechanical devices that the steering wheel lateral locking device 126 can be implemented as, include, but are not limited to: motors, actuators, magnetorheological fluid (MRF) actuators, couplers, hydraulics systems, hydraulic clamps, and other electro-mechanical devices capable having electrical and mechanical components that act as an end stop. Furthermore, the steering wheel rotation locking device 126 can be implemented to operate with a decouplable steering wheel, such as in a steer-by-wire system. In the decouplable steering wheel embodiment, the steering wheel rotation locking device 126 can be a device that implements various electronic controls that function with the steer-by-wire system. For example, the steering wheel rotation locking device 126 can electrically control the steering wheel's 127 actuator to stop rotational movement of the steering rack at the selected "locked" position.

Referring back to the example of FIG. 1, the steering wheel rotation locking controller 129 has detected the presence/location of vehicle 110 in an adjacent left lane and proximately located to the driver's side doors of the vehicle. The controller 129 can then determine that the collision area 130 is at a defined distance (or within a radius), such as 25 feet, away from this direction/location of the detected vehicle 110 close to the driver's side door (e.g., left of the vehicle), because at this set distance there is a high probability that the driver(s) will not have enough reaction time to avoid an accident. In other words, the steering wheel rotation locking controller 129 can be configured to define the collision area 130 based on set parameters that are known to contribute to a high likelihood of resulting in a collision. Further, the steering wheel rotation locking controller 129 can determine whether the vehicle 120 is within this defined collision area 130 from the detected vehicle 110.

Particularly, detecting that the vehicle 120 is inside of the defined collision area 130 indicates that the vehicles 120, 110 are dangerously close (not a safe distance) and have an increased potential to be involve in a collision (e.g., being at a distance away from each other that is less than the set distance defined by the collision area 130). In this scenario, where the vehicle 120 is detected within the defined collision area 130 from vehicle 110, the steering wheel rotation locking controller 129 is configured to automatically generate steering wheel control feedback for the driver, namely engaging the steering wheel locking rotation locking device 126, in a manner that prevents the driver from steering the vehicle 120 in a direction that would result in the vehicle 120 being driven even closer to the collision area 130 (and the nearby vehicle 110) and places the vehicle 120 in imminent danger of collision.

In some embodiments, the collision area 130 can be dynamically defined based on additional analysis of real-time vehicle data that is executed by the steering wheel rotation locking controller 129. For example, if it is determined that the vehicles 110, 120 are traveling at a high rate of speed, then the collision area 130 may be dynamically adjusted to have a distance (e.g., radius) that is increased from the initial set parameter, in order to account for the known impacts of high speed on potential collisions. The steering wheel rotation locking controller 129 can also be configured to utilize data, calculations, and parameters relating to safety and collision detection that are derived from other vehicle systems, such as vehicle safety systems, autonomous driving control systems, and collision avoidance systems, in order to define the collision area 130 with respect to a detected object.

As previously described, the steering wheel rotation locking system 121 implements a form of collision avoidance by generating steering wheel control feedback that restricts, or otherwise blocks, movement of the steering wheel 127 that would allow the driver to unsafely steer the vehicle. That is, upon detecting that the vehicle 120 is within a collision area 130 from the location of the one or more detected objects surrounding the vehicle, the steering wheel rotation locking controller 129 engages the steering wheel rotation locking device 126. The steering wheel rotation locking device 126 can interact with the steering wheel, causing the steering wheel 127's rack, for example, to lock at a selected position (e.g., rotational angle). Thus, if the steering wheel 127 is being turned by the driver in a direction (e.g., left or right) that correlates to unsafety maneuvering the vehicle in that same direction (e.g., moving towards the collision area 130 and the detected object), then the steering wheel rotation locking device 126 engages to stop the rotational movement of the steering wheel at that "locked" position. Accordingly, even if the driver tries to continue turning the steering wheel 127 further in the direction towards the collision area 130, the system 121 physically prevents the steering wheel 127 from doing so without taking human/manual control of the vehicle 120 completely away from the driver (e.g., switching to an autonomous driving mode). Particularly, once the steering wheel 127 hits the "locked" position while the steering wheel locking device 126 is engaged, its locking function mechanically or electromechanically interacts with the steering wheel 127 to stop any further rotational movement in this particular direction (e.g., towards the collision area 130). Thus, the disclosed steering wheel rotation locking system 121 provides enhanced capabilities over some currently existing vehicle safety systems that merely notify and/or signal to the driver (e.g., audible signals, vibrations, etc.), but still allow the driver to perform unsafe maneuvers in the vehicle that may cause an accident, even after the feedback/notification. In contrast, the steering wheel rotation locking system 121 provides a type of steering wheel control feedback, namely engaging the steering wheel rotation locking device 126, which physically prevents the driver from inputting dangerous lateral controls (e.g., steering wheel input) that unsafely maneuver the vehicle 120, in order to ultimately avoid collision. In some embodiments, the selected "locked" position is dynamic, and can be recalculated and/or temporarily overridden, in order to accommodate necessary maneuvers such as turns and re-positioning the vehicle 120 within its current lane (e.g., avoid other obstacles).

Furthermore, the steering wheel rotation locking system 121 does not inhibit the driver from turning the steering wheel in the opposite direction (e.g., in a direction away from the collision area 130). For instance, if the steering wheel 127 hits the "locked" position, and the driver subsequently begins to rotate the steering wheel 127 in the opposite direction (e.g., away from the collision area 130), the steering wheel locking device 126 is not engaged at these other positions in the steering wheel's 127 rotational range. Restated, the steering wheel rotation locking system 121 does not lock the steering wheel at other positions in a manner can permit full rotational movement in the opposite direction (e.g., away from the collision area 130) from the "locked" position. This allows the driver maintain manual control, having the ability to at least partially turn the steering wheel 127 and enter lateral controls for safe maneuvers that steer the vehicle 120 away from the potential collision. Thus, the steering wheel rotation locking system 121 provides steering wheel control feedback to the driver that can avert collision, while not restricting the driver's ability to continue using the steering wheel 127, for instance turning the steering wheel 127 to make safe maneuvers that could also potentially avoid the collision.

Referring back to the example environment of FIG. 1, after the steering wheel rotation locking controller 129 has determined that the vehicle 120 is within the collision area 130, it can trigger the steering wheel rotation locking device 126. As illustrated in FIG. 1, the steering wheel rotation locking device 126 can be engaged at a selected position on the steering wheel. Particularly, as the vehicle 120 has a high potential of hitting vehicle 110 if the driver continues to steer to the left towards the collision area 130 and into the adjacent lane (this can derived based on the determined location/direction of the vehicles 110, 120), the selected position (indicted in FIG. 1 by dashed line) on the steering wheel 127 for engaging the steering wheel locking device 126 is generally oriented on the left side of the wheel. Accordingly, if the driver continues to turn the steering wheel to the left and reaches the selected "locked" position, it is at this position (e.g., angle of steering wheel orientation) where the steering wheel locking device 126 interacts with the components with the steering wheel 127 such that the steering wheel 127 is prevented from having any additional rotational movement in the left direction.

In an embodiment where the steering wheel rotation locking device 126 is an electro-mechanical device, namely an hydraulic clamp, when the driver rotates the steering wheel 127 to the left and hits the "locked" position, the steering wheel locking controller 129 produces a steering wheel control feedback, for instance sending an electrical signal that causes the steering wheel locking device 126 to engage and interact with the steering wheel 127 at the selected position, in order to physically lock the steering wheel 127 and prevent further rotational movement in the left direction that is past this selected "locked" position. For example, as a hydraulic clamp, the steering wheel locking device 126 can create a mechanical end stop, such as receiving an electrical signal to apply hydraulic pressure to the clamp that effectuates a closing/clamping movement on the arms to close onto the shaft of the steering wheel 127 in a manner that prevents rotation of the steering wheel 127 to the left.

In other words, once the driver turns the steering wheel 127 to left and reaches the "locked" position, the steering wheel locking device 126 locks movement of the wheel 127 so that the driver cannot continue turning the steering wheel 127 any further to the left. Since the driver is physically prevented from rotating the steering wheel 127 any further to the left due to the system's 121 locking capability, the driver is incapable of inputting lateral controls to the vehicle 120, via the steering wheel 127, that would cause the vehicle to maneuver laterally in an unsafe direction, which is to the left into the collision area 130 and into the lane of vehicle 110 in this example.

Also, as described above, the steering wheel rotation locking system 121 does not prohibit the steering wheel 127 from its rotational movement in the opposite direction (e.g., away from the collision area 130). For example, if the steering wheel 127 is orientated at the selected "locked" position, but the driver begins to turn the steering wheel 127 to the right, which is towards an open area 135 (e.g., no surrounding objects detected) and away from the collision area 130, then the steering wheel rotation locking device 126 ceases to engage. Thus, as the driver rotates the steering wheel 127 in the opposite direction, namely to the right, the steering wheel's 127 shaft is released from being clamped, for example, which allows the steering wheel 127 to continue its rotational movement in this direction without restriction. As a result, the driver is not prevented from inputting lateral controls, via the steering wheel 127, that correspond to maneuvering the vehicle 120 safely away from a potential collision. This capability ensures that the steering wheel control feedback does not completely take away the driver's ability to control steering (e.g., as used in autonomous safety control features), which could exacerbate the severity of a collision, while still physically preventing the driver from steering the vehicle unsafely.

FIG. 1 also serves to illustrate that the position selected as the "locked" position by the steering wheel rotation locking controller 129 is a position that allows the driver to turn the steering wheel 127 at least partially to the left. For example, the steering wheel rotation locking controller 129 may calculate that that steering wheel 127 can be turned to a position corresponding to a 10° steering angle to the left (with respect to the center of the steering wheel 127 being considered a 0° steer angle) and this would not steer the vehicle 120 out of its current lane and into the collision area 130 which could potentially impede the forward progress of vehicle 110 and cause a collision. In contrast, the steering wheel rotation locking controller 129 may calculate that turning the steering wheel 127 to a position corresponding to a 20° steering angle to the left would unsafely maneuver the vehicle 120 out of its current lane and into the collision area 130. In this example, the selected "locked" position can be set to this 20° steering angle to the left, which allows the driver some freedom to at least partially rotate the steering wheel 127 to the left, until reaching the selected "locked" position (e.g., a range of angles between 0° steering angle to the left-20° steering angle to the left). Continuing with this example, the steering wheel locking device 126 would stop the rotational movement of the steering wheel 127 beyond this set "locked" position, thereby restricting the steering wheel 127 from being rotated to any steering angles that are greater than 20° to the left.

Figure 2:
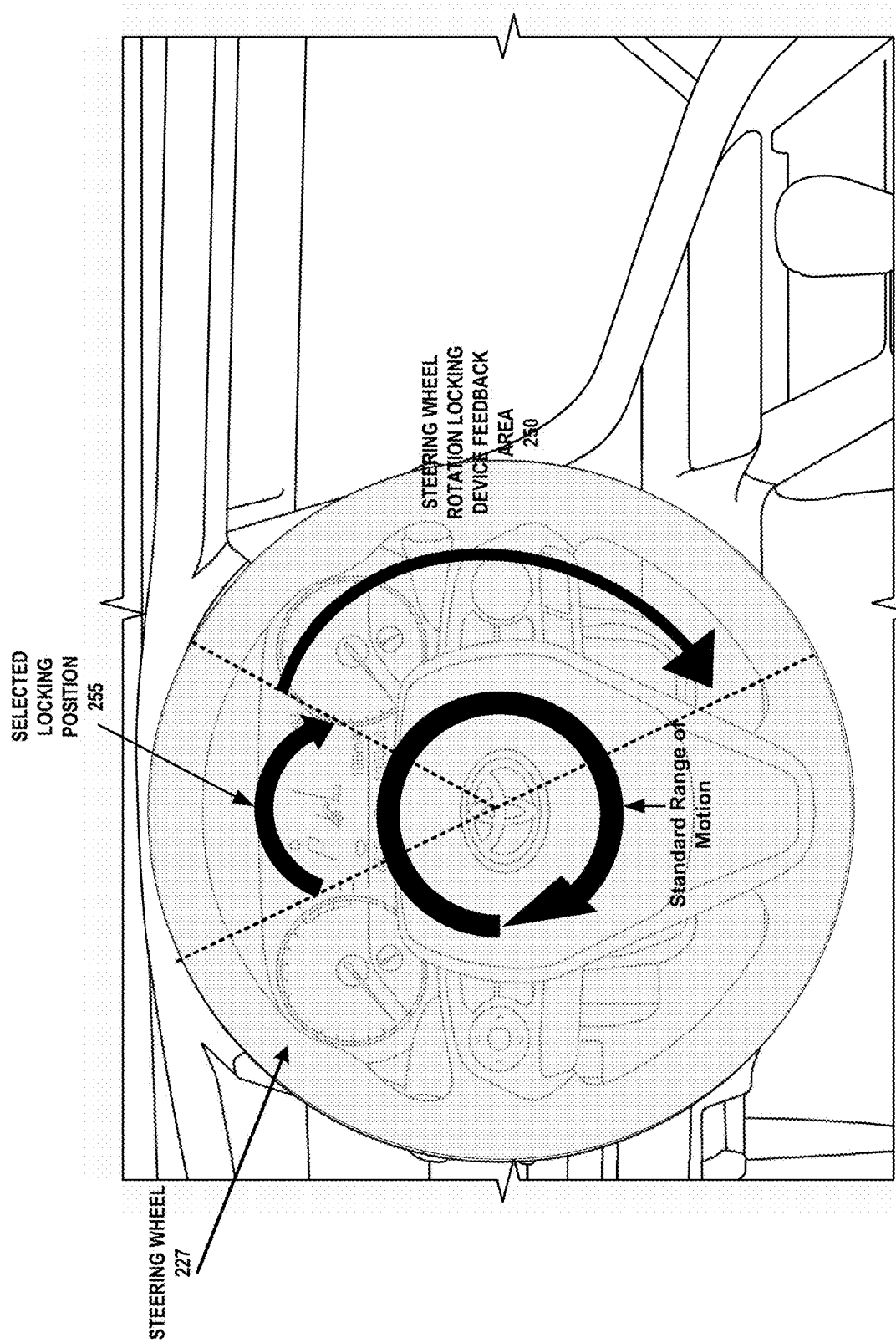
FIG. 2 is an example steering wheel of a vehicle implementing the steering wheel rotation locking controls, in accordance with an embodiment of the technology disclosed herein.

FIG. 2 illustrates an example of a steering wheel 227 of a vehicle that may be utilized when implementing the steering wheel rotation locking system 121, in accordance with the disclosed embodiments. Also, FIG. 2 illustrates an example where the steering wheel rotation locking device feedback 250 (e.g., generated by the steering wheel rotation locking device shown in FIG. 1) is effectuated on the steering wheel 227. As described in detail herein, the steering wheel rotation locking system 121 is distinctly implemented in order to automatically generate a steering wheel rotation locking feedback 250 that physically stops the rotational movement of the steering wheel 227 in one direction at a certain position that is selected by the steering wheel rotation locking controller. That is, steering wheel rotation locking feedback 250 can be input into rotation locking control 129 which may result in instructions/commands that can be used to control, i.e., prevent rotational movement such as the ability for the steering wheel to rotate beyond 30 degrees on either side, as an example.

An example of a selected position on the steering wheel 227, where the steering wheel locking capabilities are engaged, is shown in FIG. 2 as a selected locking position 255. A selected locking position 255 can be considered as a specific orientation and/or steering angle where any further rotation of the steering wheel 227 in a particular direction is physically prevented by rotation locking control 129 based on steering wheel rotation locking feedback 250. In the example of FIG. 2, the selected locking position 255 is located at a steering angle that is approximately less than 25° (from the "center" position of steering wheel 227) to the right-side of the steering wheel 227. Further, FIG. 2 illustrates that rotation locking control 129 locks movement of the steering wheel 227 based on rotation locking feedback 250 at the selected locking position 255 in a manner that stops any further rotation (indicated by curved arrow) of the steering wheel 227 particularly to the right.

For example, if the driver continuously turns the steering wheel 227 to the right and hits the selected locking position 225, where the steering wheel 227 is oriented slightly "off-center" to the right, the steering wheel rotation locking system can detect that the steering wheel's current position has reached its "locking" point for rotation. In response, the steering wheel rotation locking device feedback 250 engages and interacts with various components of the steering wheel 227 to stop rotational movement steering for wheel 227 to the right. Accordingly, by automatically locking the steering wheel 227 at this selected locking position 255, even if the driver attempts to turn the steering wheel 227 in a manner that steers the vehicle too far the right towards another vehicle and/or object where a collision would be imminent, the steering wheel rotation device feedback 250 physically blocks this movement. The steering wheel locking device feedback 250 thus prevents the driver from performing an unsafe maneuver to avoid a potential collision. In one embodiment, the wheel may not lock while still preventing an unsafe maneuver. In that instance, the wheel may be able to rotate a full 360 degrees, but past a certain point there is no input to the vehicle to further turn the vehicle. This could eliminate the need for a locking mechanism while still preventing potential collisions. Removing a locking mechanism may provide the driver a larger range of motion to appropriately react to other environmental conditions during travel.

If the steering wheel physically locks, the selected locking position 255 serves as a physical end stop for rotating the steering wheel 227 to the right, in this example. In contrast, the steering wheel rotation locking device feedback 250 does not restrict the rotational movement of the steering wheel 227 in the opposite direction. Thus, even if the driver initially turns the steering wheel 227 to the right and reaches the selected locking position 255, the driver is still permitted by the system to rotate the steering wheel 227 to the left, which in this case is in the opposite direction away from another vehicle and potential collision. Accordingly, the steering wheel rotation locking feedback 250 does not unduly restrict the drivers from inputting lateral controls that safely steering the vehicle, via the steering wheel 227, that may aid in averting a collision, such as staying in the lane or turning to moving out of the way of the object.

As previously described, the steering wheel rotation locking device feedback 250 can be implemented as various forms of steering wheel controls (automatically executed by the steering wheel rotation locking device) that interact with components of the steering wheel 227, mechanically and/or electro-mechanically, to act as an end stop and physically stop the steering wheel's 227 rotational movement. For instance, in the illustrated example of FIG. 2, the steering wheel locking device feedback 250 can cause electro-mechanical actuators to produce clamp compression of a clamping device onto the column of the steering wheel 227, which imparts an amount of resistance to stop rotational movement of the steering wheel 227 in a particular angular direction that is deemed appropriate for preventing the unsafe maneuver and thereby avoiding the unsafe maneuver.

Figure 3:
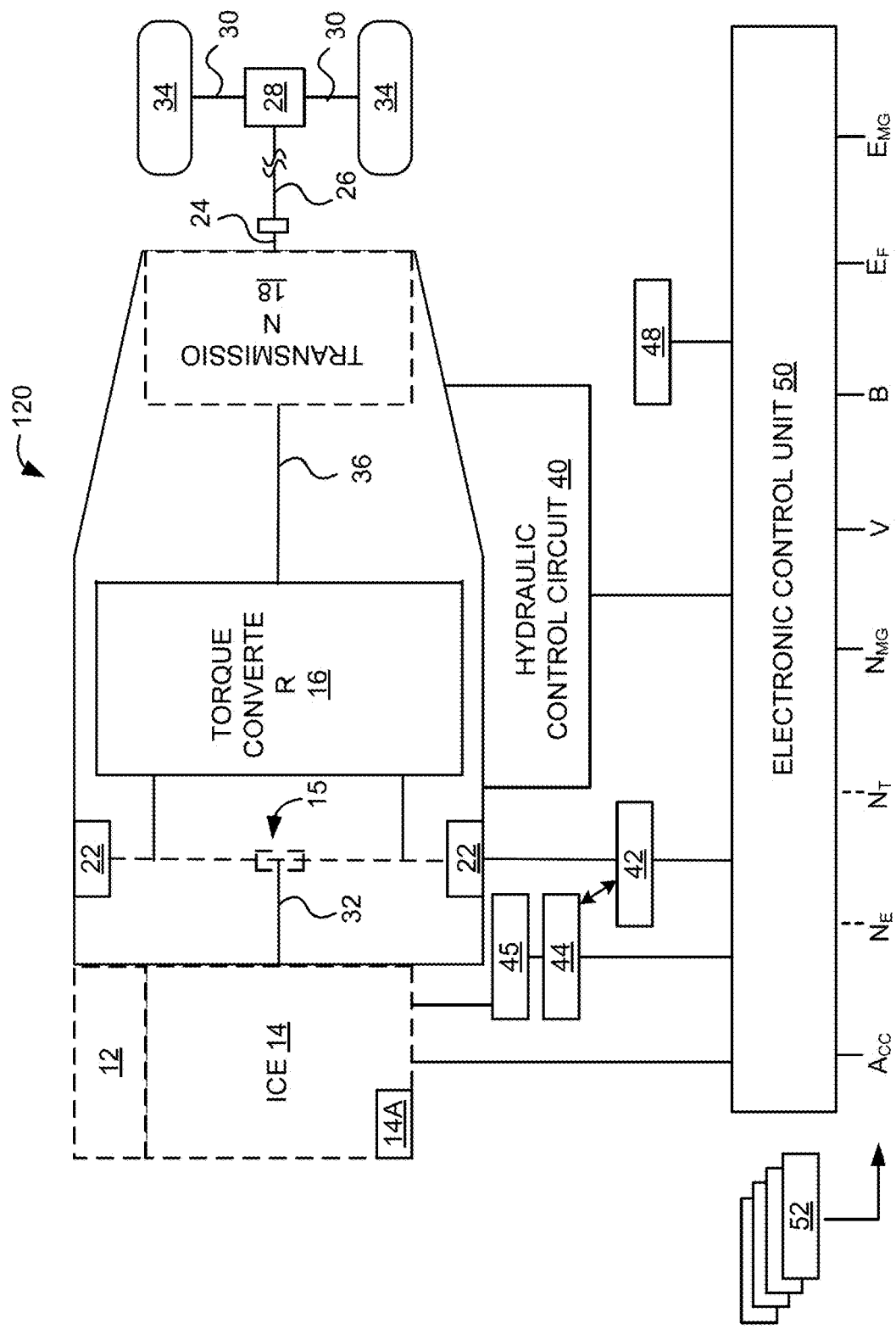
FIG. 3 is a schematic representation of an example vehicle with which embodiments of the steering wheel locking control system disclosed herein may be implemented.

FIG. 3 illustrates a drive system of a vehicle 120 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

Vehicle 120 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be a hybrid electric vehicle (HEV) travel mode that uses engine 14 and the motor(s) 22 as the sources of motive power. In the engine-only and HEV travel modes, vehicle 120 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 120 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 120 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 3, electronic control unit 50 receives information from a plurality of sensors included in vehicle 120. For example, electronic control unit 50 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 22 (motor rotational speed), and vehicle speed, NV. These may also include torque converter 16 output, NT (e.g., output amps indicative of motor output), brake operation amount/pressure, B, battery SOC (i.e., the charged amount for battery 44 detected by an SOC sensor). Accordingly, vehicle 120 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 52 can be configured to detect, and/or sense position and orientation changes of the vehicle 120, such as, for example, based on inertial acceleration. In one or more arrangements, the electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 52 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 4:
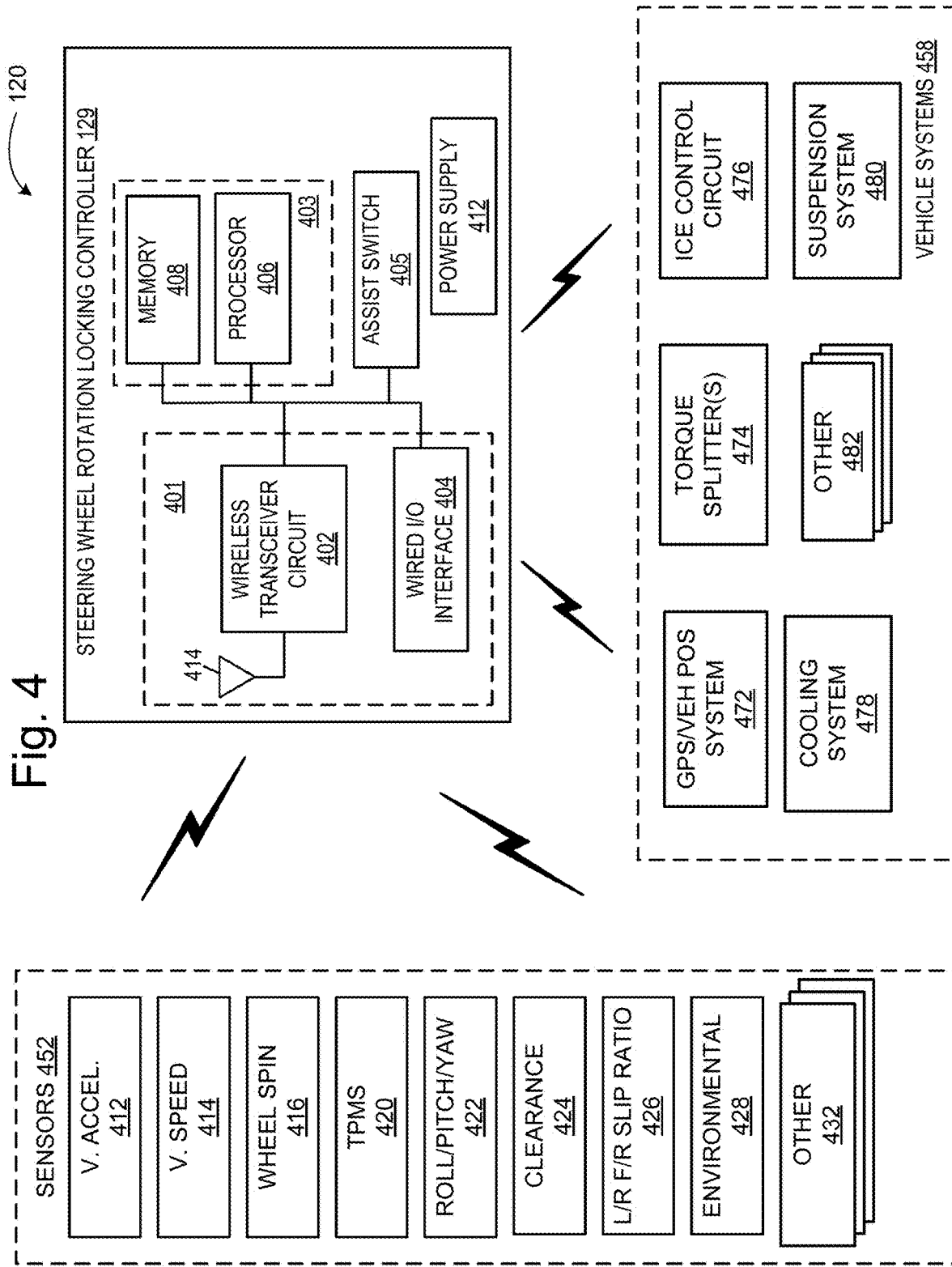
FIG. 4 illustrates an example communication architecture of the vehicle shown in FIG. 1, in accordance with an embodiment of the technology disclosed herein.

Although the example of FIG. 4 is illustrated using processor and memory circuitry, as described below with reference to circuits disclosed herein, steering wheel rotation locking controller 129 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the steering wheel rotation locking controller 129.

Communication circuit 401 either or both a wireless transceiver circuit 402 with an associated antenna 414 and a wired I/O interface 404 with an associated hardwired data port (not illustrated). As this example illustrates, communications with steering wheel rotation locking controller 129 can include either or both wired and wireless communications circuits 401. In some embodiments, the communication circuit 401 may implement the IR wireless communications from the vehicle to a hydrogen fueling station. Wireless transceiver circuit 402 can include a transmitter and a receiver (not shown) to allow wireless communications via any of a number of communication protocols such as, for example, WiFi, Bluetooth, near field communications (NFC), Zigbee, IrDA, and any of a number of other wireless communication protocols whether standardized, proprietary, open, point-to-point, networked or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by steering wheel rotation locking controller 129 to/from other entities such as sensors 452 and vehicle systems 458.

Wired I/O interface 404 can include a transmitter and a receiver (not shown) for hardwired communications with other devices. For example, wired I/O interface 404 can provide a hardwired interface to other components, including sensors 452 and vehicle systems 458. Wired I/O interface 404 can communicate with other devices using Ethernet or any of a number of other wired communication protocols whether standardized, proprietary, open, point-to-point, networked or otherwise.

Power supply 412 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 452 can include, for example, sensors 452 such as those described above with reference to the example of FIG. 1. Sensors 452 can include additional sensors that may or not otherwise be included on a standard vehicle with which the steering wheel rotation locking system is implemented. In the illustrated example, sensors 452 include vehicle acceleration sensors 412, vehicle speed sensors 414, wheelspin sensors 416 (e.g., one for each wheel), a tire pressure monitoring system (TPMS) 420, accelerometers such as a 3-axis accelerometer 422 to detect roll, pitch and yaw of the vehicle, vehicle clearance sensors 424, left-right and front-rear slip ratio sensors 426, and environmental sensors 428 (e.g., to detect salinity or other environmental conditions). Additional sensors 432 can also be included as may be appropriate for a given implementation.

Vehicle systems 458 can include any of a number of different vehicle components or subsystems used to control or monitor various aspects of the vehicle and its performance. In this example, the vehicle systems 458 include a GPS or other vehicle positioning system 472; torque splitters 474 they can control distribution of power among the vehicle wheels such as, for example, by controlling front/rear and left/right torque split; engine control circuits 476 to control the operation of engine (e.g. Internal combustion engine 14); cooling systems 478 to provide cooling for the motors, power electronics, the engine, or other vehicle systems; suspension system 480 such as, for example, an adjustable-height air suspension system, and other vehicle systems.

During operation, steering wheel rotation locking controller 129 can receive information from various vehicle sensors 452. Also, the driver may manually activate a manual/non-autonomous operation mode (implementing the steering wheel locking capabilities) by operating switch 405. Communication circuit 401 can be used to transmit and receive information between the steering wheel rotation locking controller 129 and sensors 452, and steering wheel rotation locking controller 129 and vehicle systems 458. Also, sensors 452 may communicate with vehicle systems 458 directly or indirectly (e.g., via communication circuit 401 or otherwise).

Figure 5:
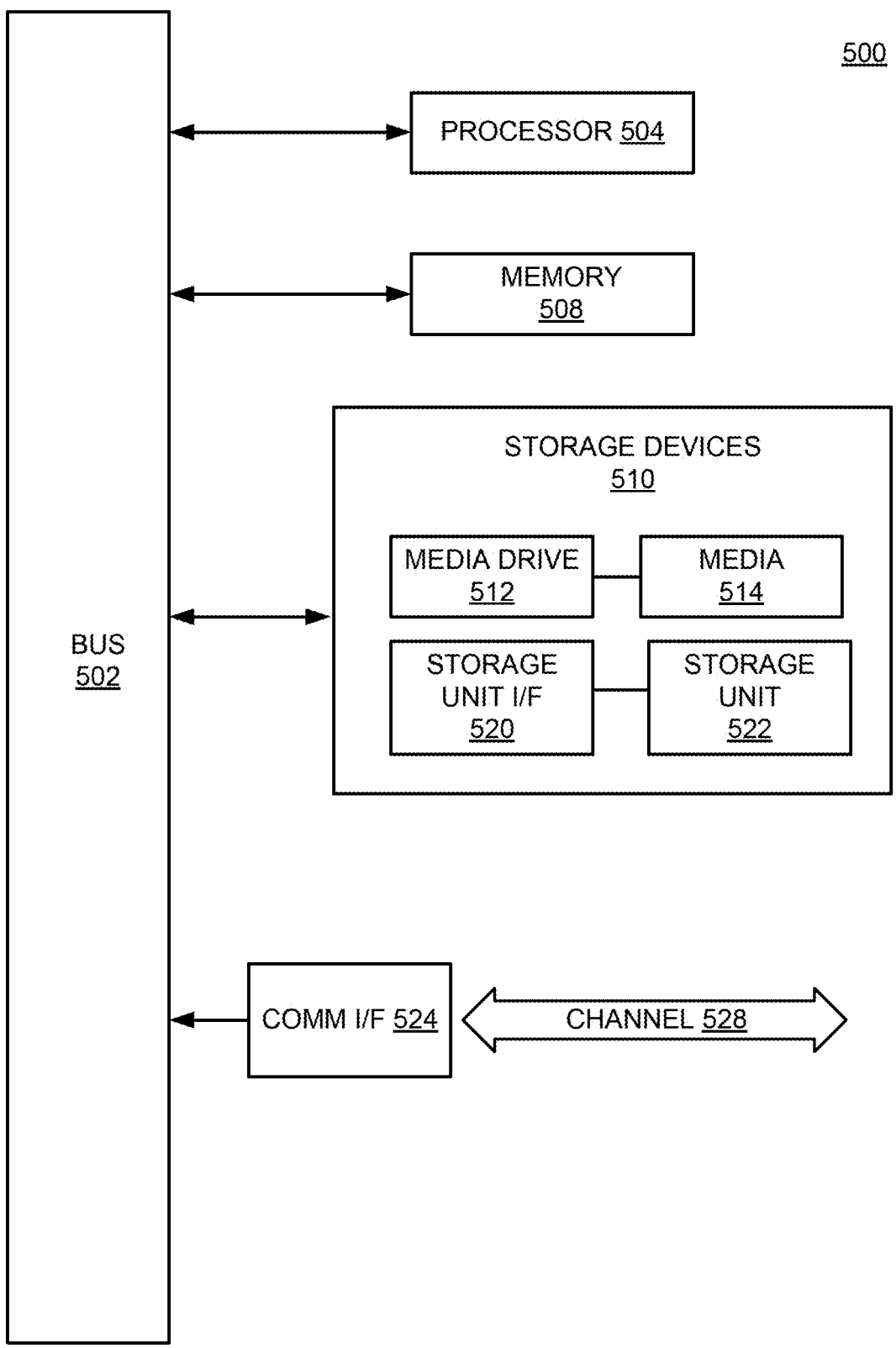
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
   a steering wheel rotation locking device; and
   a controller communicatively connected to the steering wheel rotation locking device, wherein the controller:
   determines a presence and location of one or more objects or conditions on a collision course with a vehicle, based on an analysis of vehicle data; and
   upon determining that the one or more objects surrounding the vehicle is on a collision course with the vehicle, controls the steering wheel rotation locking device to produce steering wheel control feedback to physically prevent rotational movement of a steering wheel in a direction that correlates to maneuvering the vehicle in a lateral direction towards the collision area and the presence and location of the one or more surrounding objects.

2. The system of claim 1, wherein the controller further:
   determines a selected position of the steering wheel to engage the steering wheel rotation locking device, wherein the selected position correlates to a steering angle of the steering wheel that maneuvers the vehicle in the lateral direction towards the collision area and the one or more objects surrounding the vehicle.

3. The system of claim 2, wherein the steering wheel rotation locking device comprises a mechanical device that produces the steering wheel control feedback that mechanically engages the steering wheel to lock at the selected position and prevent rotational movement of the steering wheel past the selected position in the direction.

4. The system of claim 3, wherein the steering wheel lateral locking device comprises at least one of: a pin, a clamp, a grip, a stopper, a wedge, a bolt, or fastener device.

5. The system of claim 2, wherein the steering wheel rotation locking device comprises an electro-mechanical system that produces the steering wheel control feedback that electro-mechanically engages the steering wheel to lock at the selected position and prevent movement of the steering wheel past the selected position.

6. The system of claim 5, wherein the electromechanical system comprises at least of: a motor; an actuator, a magnetorheological fluid actuator, a coupler, a hydraulic device, a hydraulic system, or hydraulic clamp.

7. The system of claim 2, wherein the steering wheel rotation locking device comprises an electrical system that produces the steering wheel control feedback that electrically engages the steering wheel to lock at the selected position and prevent rotational movement of the steering wheel past the selected position.

8. The system of claim 7, wherein the electrical system communicates electronic commands to a steer-by-wire system to engage the steering wheel to lock at the selected position.

9. The system of claim 7, wherein the controller enables rotational movement of a steering wheel to positions in an opposite direction that correlate to maneuvering the vehicle in the opposite lateral direction away from the collision area.

10. The system of claim 1, wherein the vehicle data is received from one or more vehicle sensors that monitor one or more area surrounding the vehicle.

11. The system of claim 2, further comprising:
    one or more steering wheel sensors to obtain steering wheel data to determine a current position of the steering wheel.

12. The system of claim 11, wherein the controller further:
    analyzes the steering wheel data to determine whether the current position of the steering wheel is at the selected position; and
    engages the steering wheel rotation locking device.

13. The system of claim 12, wherein the one or more steering wheel sensors comprise at least one of: steering wheel angle sensors, steering torque sensors, turn direction sensors, or analog sensors.

14. A non-transitory computer readable medium comprising instructions, that when read by a processor, cause the processor to:
    determine a presence and location of one or more objects on a collision course with a vehicle, based on an analysis of vehicle data; and
    upon determining that the presence and location of the one or more objects surrounding the vehicle is on a collision course with the vehicle, control the steering wheel rotation locking device to produce steering wheel control feedback to physically prevent rotational movement of a steering wheel in a direction that correlates to maneuvering the vehicle in a lateral direction towards the collision area and the presence and location of the one or more surrounding objects.

15. The non-transitory computer readable medium of claim 14, comprising instructions that cause the processor to further perform:
    determine a selected position of the steering wheel to engage the steering wheel rotation locking device, wherein the selected position correlates to a steering wheel angle of the steering wheel that maneuvers the vehicle in the lateral direction towards the collision area and the one or more objects surrounding the vehicle.

* * * * *